Patented Nov. 5, 1946

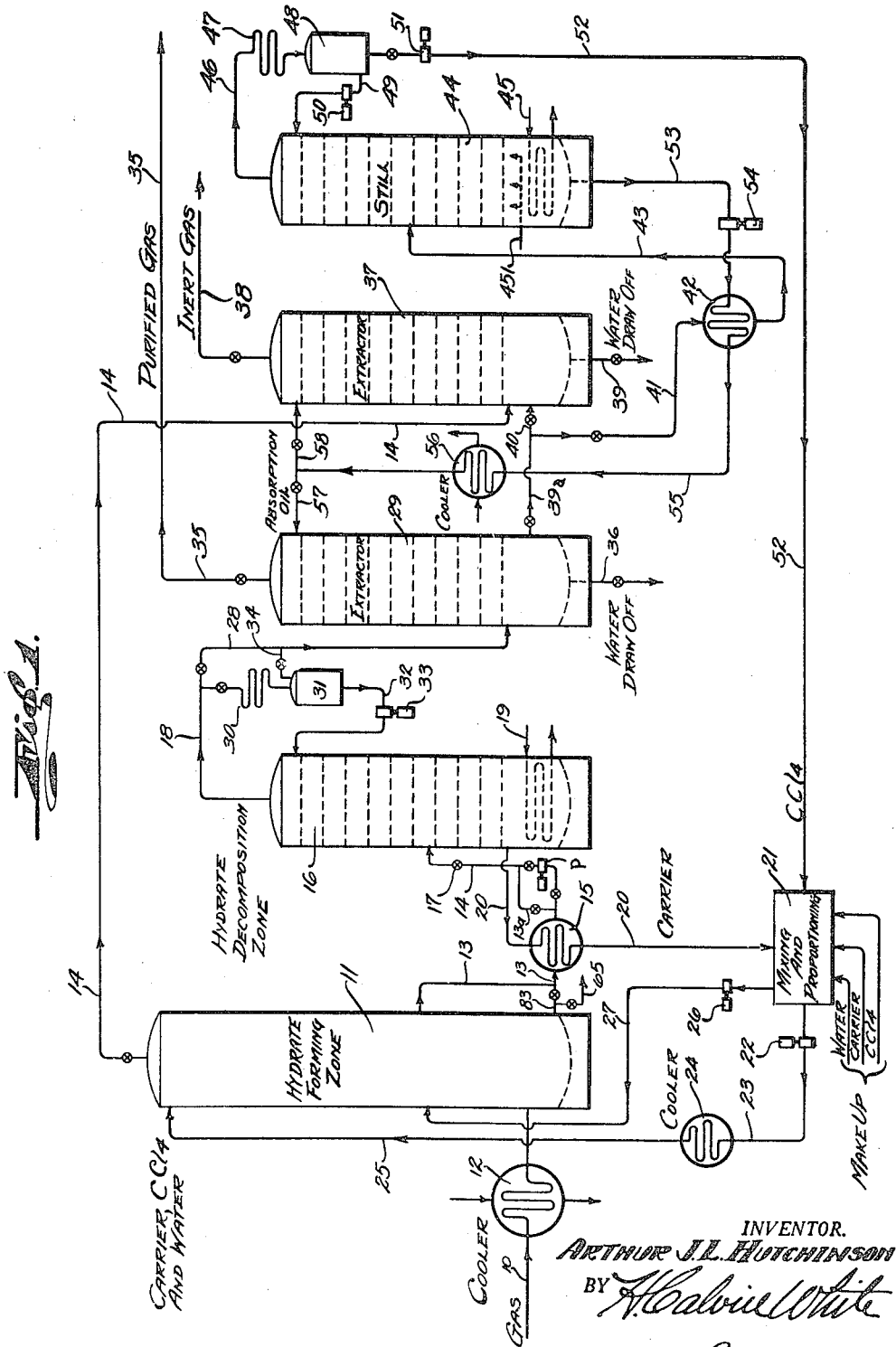

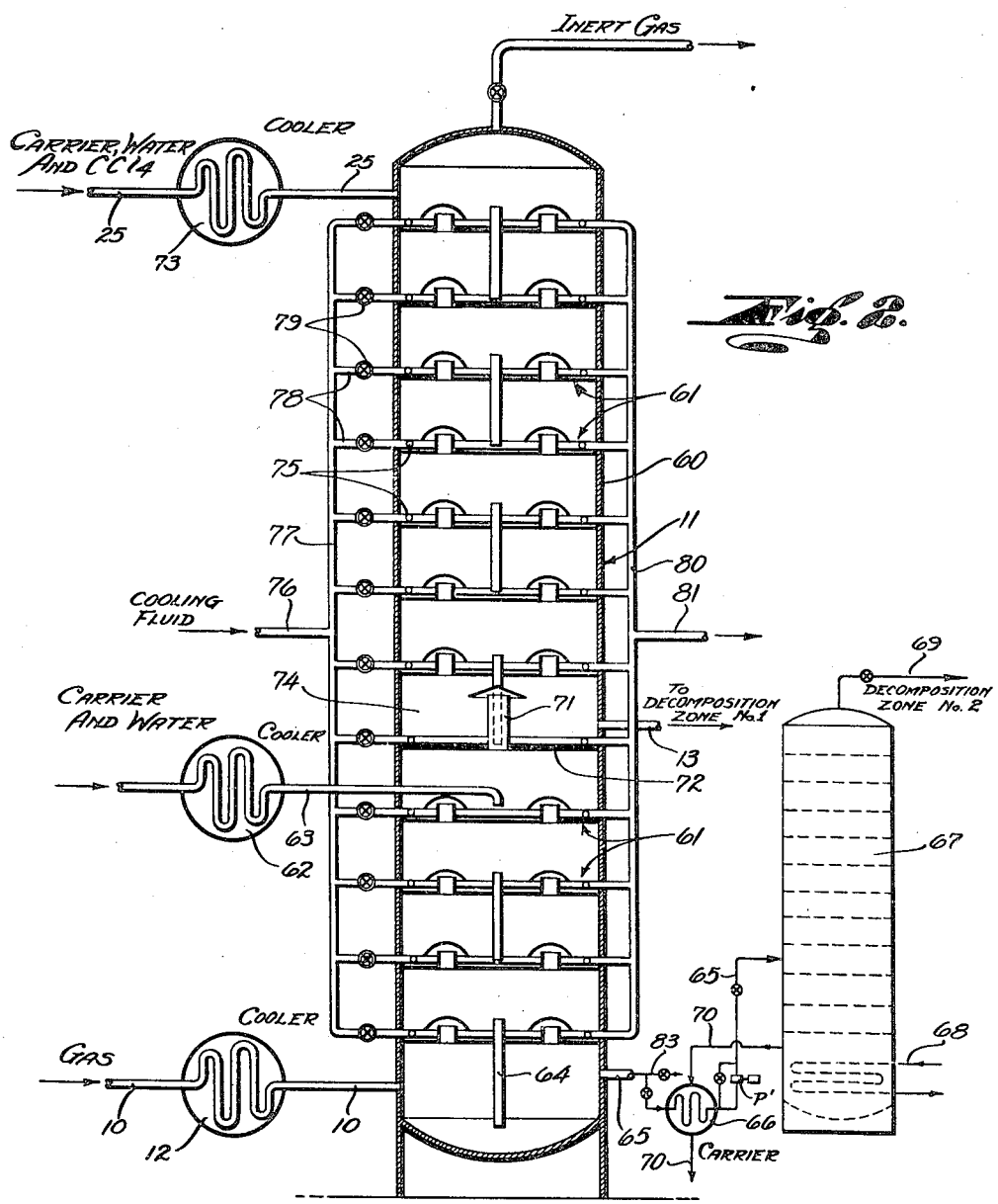

2,410,583

UNITED STATES PATENT OFFICE 2,410,583

SEPARATION OF HYDRATE-FORMING COMPONENTS OF GASEOUS MIXTURES

Arthur J. L. Hutchinson, San Marino, Calif., assignor to The Fluor Corporation, Ltd., Los Angeles, Calif., a corporation of California Application July 10, 1943, Serial No. 494,164

10 Claims. (Cl. 260—676)

This invention has to do with improved processes for the separation from normally gaseous mixtures containing one or more hydrate-forming components, of one or more components incapable of forming hydrates, or at least which do not form hydrates under the conditions of treatment in the process. More particularly the invention is directed to the separation from hydrocarbon gases such as natural gas or refinery tail gas, of undesirable or inert gases, of which nitrogen and hydrogen may be taken as typical. This application is a continuation-in-part of Hutchinson application Serial No. 392,186, filed May 6, 1941, on Fractionation of hydrate-forming hydrocarbons, and Hutchinson application Serial No. 407,036, filed August 14, 1941, on System for forming and storing hydrocarbon hydrates.

Generally speaking, the present process involves phase segregation of hydrate-forming hydrocarbon components, from inert or non-hydrate-forming components, by converting the former to their solid hydrates and separating the non-hydrated fluid phase. One basically distinctive aspect of the process, is the method whereby the hydrates may be subjected to continuous dissociation in a single zone receiving a stream of the hydrates, with the end result that the raw gas being treated undergoes continuous separation into two continuously flowing streams of its hydrocarbon and inert components. Specifically, the invention contemplates subjecting the gas in a conversion zone and in the presence of water, to pressure and temperature conditions causing hydration of the component or components to be hydrated, separating the non-hydrated gas, and continuously transferring the hydrates to a suitable decomposition zone wherein the hydrates undergo continuous dissociation and reconversion into gas.

Transference of the hydrates from the conversion zone to the decomposition zone may be facilitated by the use of a hydrate carrier fluid, which in the broad aspects of the invention may be any suitable fluid medium capable of entraining and aiding the transference of the hydrate crystals. I may employ as the carrier fluid, residual liquid remaining after the hydration, or a non-aqueous liquid, such as kerosene or other mineral oil fraction, to particular advantage because of its further utility as a dispersing medium for water particles to be consumed in the hydration, and also for the later described additive, if used. After separation from the hydrates or hydratable components, as in the decomposition zone, the carrier liquid may be returned to the hydrate-forming zone, and thus maintained in a state of continuous circulation between the two zones.

Another object of the invention is to provide for a high degree of separation of the inert components from the gas, by the formation of a hydrate phase characterized by its readiness of formation, stability and low vapor pressure, all of which properties tend to permit segregation out of the gas of the maximum percentages of its hydrate-forming components. In this respect, the invention contemplates treatment of the hydrocarbon in the presence of an additive, to produce what may be referred to generally as a mixed hydrate of the hydrocarbons and additive, characterized by its readiness of formation and considerably lower vapor pressure, and therefore greater stability, than the pure hydrate of the same hydrocarbon at the same temperature.

The invention broadly contemplates the use of any suitable additive capable of forming with hydrate-forming hydrocarbons, a mixed hydrate, or hydrate complex, as hereinafter designated, the mixed hydrate having the property of substantially lower vapor pressure than the vapor pressure of the hydrate of the hydrocarbon component of the mixed hydrate. Suitable additives fall within the general class of halogenated hydrocarbons which are liquid at 0° C. and are capable of forming with a hydrate-forming hydrocarbon under proper temperature and pressure conditions, a mixed hydrocarbon-halogenated hydrocarbon hydrate. Included among such halogenated hydrocarbons are carbon tetrachloride, bromoform, chloroform, ethylene dichloride, methylene chloride, methyl iodide, methylene iodide, and the tri-halogen compounds of methane and ethane. For purposes of description, carbon tetrachloride will be referred to hereinafter as the additive, with the understanding that it is to be regarded as typical of suitable additives in general, and of the class consisting of the halogenated hydrocarbons.

The additive, e. g. carbon tetrachloride, may be introduced, as later described, to the hydrate-forming zone in which it is converted, together with the hydrocarbon, into a mixed hydrate. The exact nature and composition of the resulting hydrate complex is not known at present, and consequently the expression "mixed hydrate" is used as a term of designation, rather than of definition, and is not intended to be limitative with respect to any particular form or composition of the hydrate complex. That composition may be in the nature of a depressed vapor pressure mixture of the two hydrates, or of a double hydrate of the hydrocarbons and carbon tetrachloride, or it may involve a solution of some of the hydrocarbon in the carbon tetrachloride hydrate, or a solution of some of the carbon tetrachloride in the hydrocarbon hydrate. Whatever its exact composition may be, the mixed hydrate has the important property of low vapor pressure, of which advantage may be taken for the purposes of the present process.

The invention contemplates various additional particular features of operation, such as partial hydration of the hydrocarbon components of the gas alone, followed by hydration of unconverted hydrocarbons together with the additive. Contemplated also are methods for the recovery of the additive from both the separated hydrocarbon and inert gas streams, and return of the recovered additive to the hydrate-forming zone.

All the objects and features of the invention will be more fully explained and understood to better advantage from the following description of a typical system illustrated by the accompanying drawings, in which:

Fig. 1 is a schematic layout, in flow sheet form, illustrating a typical system embodying the invention; and Fig. 2 is a view, largely diagrammatic, showing the hydrate-forming zone in vertical section, and including also a secondary hydrate decomposition zone to be used if required.

It will be understood that the gas fed to the system under pressure through line 10, may consist of any of various mixtures of one or more hydrate-forming components, with one or more inert constituents which either are incapable of forming hydrates under any conditions, or under the particular conditions existing in the hydrate-forming zone. As illustrative, assume that the system is to be operated for extracting from a natural gas containing hydrate-forming hydrocarbons included in the $C_1$, $C_2$, and $C_3$ range, an inert fraction containing a high percentage of nitrogen, the nitrogen content for example running as high as from 10 to 15% by volume of the natural gas. In order to reduce the heat load (resulting from the heat of hydrate formation) on the hydrate-forming column 11, the gas first may be passed through one or more coolers 12 within which the gas temperature may be lowered as desired. Within column 11, the gas is contacted with water, and preferably also with a non-aqueous carrier liquid and a hydrate-forming additive, under temperature and pressure conditions causing conversion to their solid hydrates of substantially all, or at least a greater portion of the hydrate-forming components of the gas. The more particular details and aspects of the hydrate formation within the column 11, will be described later with reference to Fig. 2. At this point it will suffice to observe that the gas and water may be contacted within the column 11 under any suitable temperature and pressure conditions at which the desired degree of hydrate formation will occur, for example at a temperature between 35 and 45° F. and under pressure between 400 and 650 pounds per square inch. The presence of the additive, if used, may lower very considerably the required pressure for the hydrate formation at a given temperature, or conversely, permit the use of considerably high temperatures to effect the hydrate formation under a given pressure. As a result of its treatment in column 11, the gas is segregated into hydrated hydrocarbon components which, together with any higher boiling non-hydrate-forming hydrocarbon components, are continuously withdrawn from the base of the column through line 13, and gaseous inert constituents which are separately and continuously withdrawn from the top of the column through line 14.

The hydrate formed in column 11, and which preferably is a mixed hydrocarbon-carbon tetrachloride hydrate, is continuously discharged in a stream of the carrier liquid, e. g. kerosene, through lines 13, 13a and heat exchanger 15 into the hydrate decomposition zone 16. The pressure on the hydrates may be reduced at the discharge side of valve 17 should it be desired to facilitate dissociation of the hydrates by virtue of the reduced pressure. Ordinarily, however, it may be desired to decompose the hydrates at increased pressure in order to permit absorption recovery of the carbon tetrachloride at pressures sufficiently high for most efficient operation. Accordingly, the hydrate-carrier stream may be forced by pump P into zone 16, wherein the hydrate dissociation may occur under any desired pressure.

While the hydrate decomposition zone 16 may be of any suitable type and form, it is preferred to use a vertically extended column to more effectively remove hydrate-forming hydrocarbons and carrier liquid from the gas going to the outlet line 18. Heat may be supplied to the column 16 in any suitable manner, as by a bottom coil heater 19, to effect complete dissociation of the hydrate. The residual carrier liquid is discharged through line 20 and exchanger 15 for recirculation to the hydrate-forming zone 11, after again mixing the carrier with water and carbon tetrachloride. Any suitable methods and apparatus may be employed at 21 for mixing and proportioning the carrier liquid, water and carbon tetrachloride to be recirculated, and for supplying any necessary make-up carrier, water and carbon tetrachloride. It is contemplated that the resulting mixture may be in the form of an emulsion formed by suitably mixing and agitating the carrier liquid, water and carbon tetrachloride together with an emulsifying agent, for example dioctyl sodium sulfo succinate, known commercially as "Aerosol OT." The mixture, or emulsion, is discharged by pump 22 through line 23 and cooler 24 to the top of the hydrate-forming column 11. Where operation of the column requires the introduction at an intermediate location of a carrier liquid-water mixture, all as later explained, such mixture, containing no carbon tetrachloride, may be supplied from the mixing and proportioning plant 21 by pump 26 through line 27.

The hydrocarbon gas leaving column 16 through line 18, and containing water and carbon tetrachloride vapors, may be passed directly through line 28 to the extractor 29, or the gas may be subjected to partial condensation in condenser 30 to provide a suitable amount of condensate to be returned from accumulator 31 through line 32 and pump 33 to the column 16 as reflux, the uncondensed gas passing through line 34 connecting with the extractor feed line 28. The carbon tetrachloride content of the hydrocarbon gas stream is extracted in column 29 by intimately contacting the rising gas stream therein with a downwardly flowing absorption liquid, such as a fairly high boiling mineral oil fraction, in which the carbon tetrachloride is recovered by absorption. The extractor column may be operated at any suitable pressure and oil rate to effect solution from the gas phase of the carbon tetrachloride vapor. The purified hydrocarbon gas is taken from the column through line 35 for such disposal as may be desired. Water condensate accumulating within the bottom of the extractor, may be intermittently or continually drawn off through line 36.

The inert gas, containing some carbon tetrachloride and withdrawn from the hydrate-forming zone through line 14, may be similarly given an absorption oil treatment for extraction of the carbon tetrachloride. Accordingly, the inert gas stream may be introduced from line 14 into a second extractor column 37 wherein the gas is contacted with down-flowing absorption oil. Carbon tetrachloride-free gas is taken from the top of the column through line 38. Water accumulating in the bottom of the column is withdrawn through line 39.

The absorption oil streams with their absorbed carbon tetrachloride, are withdrawn from the extractors 29 and 37 through lines 39a and 40 to be taken through line 41, heat exchanger 42 and line 43 to a still 44 supplied with heat as by the bottom coil 45, and also, if desired, by live steam through line 45l. In still 44 the absorption oil is heated sufficiently to vaporize the carbon tetrachloride, the latter passing through line 46 to condenser 47 and the condensate accumulator 48. A portion of the condensate may be returned through line 49 and pump 50 to the top of the still as reflux. From accumulator 48 the carbon tetrachloride is discharged by pump 51 through line 52 to the mixing and proportioning plant 21. The stripped absorption oil leaving the bottom of the still through line 53 is forced by pump 54 through exchanger 42, line 55, cooler 56 and the branch lines 57 and 58 into the extractor columns 29 and 37.

Further consideration now may be given the operation of the hydrate-forming column 11 and the methods contemplated for securing high percentage removal, in the form of their hydrates, of the hydrate-forming components of the gas treated. Referring to Fig. 2, the hydrate-forming zone 11 may consist essentially of a fractionating column 60 containing a vertical series of bubble trays conventionally illustrated at 61. According to the method of operation specifically illustrated, the precooled gas introduced to the bottom of the column through line 10 rises through the lower series of bubble trays 61 in intimate contact with a mixture or emulsion of the non-aqueous carrier liquid and water pre-cooled in cooler 62 and introduced to an intermediate location in the column through line 63. Co-mingling of the gas with this carrier and water stream produces partial hydration of the hydrate-forming hydrocarbon components of the gas, the resulting hydrates being entrained in the carrier liquid and carried downwardly through the usual overflow pipes 64 to the bottom of the column. The hydrates thus are transferred in the carrier liquid through line 65 (and by pump P' if desired), and the heat exchanger 66 into a hydrate decomposition zone 67 supplied with heat by the bottom coil 68. In column 67 the hydrates are dissociated to release the hydrocarbon gas for removal and such use as may be desired, through line 69. If desired, the latter may connect into line 35 of Fig. 1. The residual carrier liquid and water may be withdrawn through line 70 and exchanger 66 to be sent to the mixing and proportioning plant 21.

The non-hydrated gas rising from the bottom section of the column 60 flows through the baffled vapor neck 71 extending above plate 72, into the upper section of the column wherein the gas is contacted with a down-flowing stream of mixed or emulsified non-aqueous carrier liquid, water and additive such as halogenated hydrocarbon, e. g. carbon tetrachloride. The latter mixture or emulsion entering the column through line 25 and cooler 73 may contain the carrier, water and carbon tetrachlorite in any desired proportions, so long as the water present in the column is sufficient for formation of the mixed hydrate, and the quantity of carrier liquid is adequate for entrainment and transference of the formed hydrates. The carbon tetrachloride content of the mixture or emulsion is not critical and may run in the neighborhood of 10% to 90%, depending upon various considerations including the quantity and composition of the hydrate-forming hydrocarbons in the gas being treated. Intimate association of the gas and liquid mixture introduced through line 25, results in the formation within the upper section of the column of what has been termed the mixed hydrocarbon-carbon tetrachloride hydrate. The latter forms at stages or on the bubble trays progressing upwardly within the column, and the formed hydrate is continuously flushed downward through the trays in the carrier liquid into chamber 74 from which the hydrates are transferred through line 13 to the decomposition zone 16.

In the upper section of the column, the gas is effectively depleted of its hydratable hydrocarbon content by reason of the hydrate-forming load on this section of the column having been reduced by and to the extent of the hydrates forming in the bottom section of the column. Complete final hydration of the hydrocarbons is further and effectively assured by reason of the relative ease of formation of the mixed hydrocarbon and carbon tetrachloride hydrate, and its comparatively low vapor pressure and resultant stability.

Reference previously has been made to precooling of the gas, as well as the water and carrier liquids, to compensate for heat of hydrate formation. Such heat may further be compensated by the withdrawal of heat of hydrate formation from within the column itself. Typically, the several bubble trays 61 may carry cooling coils 75 to which a suitable refrigerant or cooling fluid is supplied from line 76 through manifold 77 and the valved branches 78, the valves 79 being individually adjustable to permit selective temperature control on any of the trays. After passage through the coils 75, the cooling fluid enters the outlet manifold to be discharged through line 81.

According to the method just described, hydrocarbon hydrates are formed in the lower section of the column, and the mixed hydrocarbon-carbon tetrachloride hydrate is formed in the upper section of the column, by selective introduction of the two aqueous liquids through lines 63 and 25 and separate withdrawal of the hydrates through lines 65 and 13. If desired, the entire column may be used for the formation of the mixed hydrate, in which event plate 72 may be replaced by a bubble cap tray 61, the water-carrier inlet line 63 dispensed with, and the composition of the stream introduced to the top of the column through line 25, adjusted to contain sufficient carbon tetrachloride and water for conversion of all the hydrate-forming hydrocarbons of the gas to a mixed hydrocarbon-carbon tetrachloride hydrate. When the column is operated in this manner, the mixed hydrate withdrawn through line 65, instead of through line 13, may be taken through the valved line 83 into line 13 for delivery to the decomposition zone 16, all as illustrated in Fig. 1.

I claim:

1. The method of treating a gas comprising a mixture of hydrate-forming hydrocarbon components and an inert non-hydrate-forming constituent to separate said inert constituent, that includes contacting said gas with water and a hydrate-forming halogenated aliphatic hydrocarbon additive in a conversion zone under temperature and pressure conditions causing formation of a mixed hydrate of said hydrocarbon components and additive, said mixed hydrate having substantially lower vapor pressure than the hydrate of said hydrocarbon components alone and at corresponding temperature, separating said inert constituent from the mixed hydrate, continuously removing the hydrates from said zone and dissociating the removed hydrates, recovering said additive, and returning the additive to the conversion zone.

2. The method of treating a gas comprising a mixture of hydrate-forming hydrocarbon components and an inert non-hydrate-forming constituent to separate said inert constituent, that includes contacting said gas with water intimately mixed with a non-aqueous liquid and a hydrate-forming halogenated aliphatic hydrocarbon additive in a conversion zone and under temperature and pressure conditions causing formation of a mixed hydrate of said hydrocarbon components and additive, said mixed hydrate having substantially lower vapor pressure than the hydrate of said hydrocarbon components alone at corresponding temperature, and separating said inert constituent from the mixed hydrate, continuously removing the hydrates from said zone and dissociating the removed hydrates, recovering said additive, and returning the additive to the conversion zone.

3. The method of treating a gas comprising a mixture of hydrate-forming hydrocarbon components and an inert non-hydrate-forming constituent to separate said inert constituent, that includes contacting said gas with water and carbon tetrachloride in a conversion zone under temperature and pressure conditions causing formation of a mixed hydrate of said hydrocarbon components and carbon tetrachloride, said mixed hydrate having substantially lower vapor pressure than the hydrate of said hydrocarbon components alone at corresponding temperature, and separating said gaseous inert constituent from the mixed hydrate, continuously removing the hydrates from said zone and dissociating the removed hydrates, recovering said additive, and returning the additive to the conversion zone.

4. The method of treating a gas comprising a mixture of hydrate-forming hydrocarbon components and an inert non-hydrate-forming constituent to separate said inert constituent, that includes contacting said gas with water and halogenated aliphatic hydrocarbon additive in a conversion zone under temperature and pressure conditions causing formation of a mixed hydrate of said hydrocarbon components and additive, said mixed hydrate having substantially lower vapor pressure than the hydrate of said hydrocarbon components alone and at corresponding temperature, separating said gaseous inert constituent from the mixed hydrate, transferring said mixed hydrate from said conversion zone to a decomposition zone, therein heating and dissociating the hydrate, recovering said additive from the products of the hydrate dissociation, and returning the additive to the conversion zone.

5. The method of treating a gas comprising a mixture of hydrate-forming hydrocarbon components and an inert non-hydrate-forming constituent to separate said inert constituent, that includes contacting said gas with water and a halogenated aliphatic hydrocarbon in a conversion zone under temperature and pressure conditions causing formation of a mixed hydrate of said hydrocarbon components and halogenated hydrocarbon, said mixed hydrate having substantially lower vapor pressure than the hydrate of said hydrocarbon components alone and at corresponding temperature, separating said gaseous inert constituent from the mixed hydrate, transferring said mixed hydrate from said conversion zone to a second zone and therein dissociating the hydrate to vaporize the halogenated hydrocarbon and said hydrocarbon components, and recovering the halogenated hydrocarbon from the resulting vapors.

6. The method of treating a gas comprising a mixture of hydrate-forming hydrocarbon components and an inert non-hydrate-forming constituent to separate said inert constituent, that includes contacting said gas with water and a halogenated aliphatic hydrocarbon in a conversion zone under temperature and pressure conditions causing formation of a mixed hydrate of said hydrocarbon components and halogenated hydrocarbon, said mixed hydrate having substantially lower vapor pressure than the hydrate of said hydrocarbon components alone and at corresponding temperature, separating said gaseous inert constituent from the mixed hydrate, transferring said mixed hydrate from said conversion zone to a second zone and therein dissociating the hydrate to vaporize the halogenated hydrocarbon and said hydrocarbon components, extracting the halogenated hydrocarbon from the resulting vapors in absorption oil, heating the absorption oil to vaporize the halogenated hydrocarbon therefrom, and condensing the halogenated hydrocarbon vapors.

7. The method of treating a gas comprising a mixture of hydrate-forming hydrocarbon components and an inert non-hydrate-forming constituent to separate said inert constituent, that includes contacting said gas wtih water and a vaporizable halogenated aliphatic hydrocarbon additive in a conversion zone under temperature and pressure conditions causing formation of a mixed hydrate of said hydrocarbon components and additive, said mixed hydrate having substantially lower vapor pressure than the hydrate of said hydrocarbon components alone and at corresponding temperature, separating said gaseous inert constituent from the mixed hydrate, and contacting the separated gas with absorption oil to extract therefrom the additive carried by the gas from the conversion zone.

8. The method of treating a gas comprising a mixture of hydrate-forming hydrocarbon components and an inert non-hydrate-forming constituent to separate said inert constituent, that includes treating said gas to partially hydrate said hydrate-forming components, then contacting the residual gas wtih water and a hydrate-forming halogenated aliphatic hydrocarbon additive under temperature and pressure conditions causing formation of a mixed hydrate of the hydrocarbon components and additive, said mixed hydrate having substantially lower vapor pressure than the hydrate of said hydrocarbon components alone and at corresponding temperature, separating said inert constituent from the mixed hydrate, dissociating the mixed hydrate, and recovering said additive from the products of the hydrate dissociation.

9. The method of treating a gas comprising a mixture of hydrate-forming hydrocarbon components and an inert non-hydrate-forming constituent to separate said inert constituent, that includes treating said gas to partially hydrate said hydrate-forming components, then contacting the residual gas with water and a halogenated aliphatic hydrocarbon under temperature and pressure conditions causing formation of a mixed hydrate of the hydrocarbon components and halogenated hydrocarbon, said mixed hydrate having substantially lower vapor pressure than the hydrate of said hydrocarbon components alone and at corresponding temperature, separating said inert constituent from the mixed hydrate, dissociating the mixed hydrate, and recovering said additive from the products of the hydrate dissociation.

10. The method of treating a gas comprising a mixture of hydrate-forming hydrocarbon components and an inert non-hydrate-forming constituent to separate said inert constituent, that includes treating said gas to partially hydrate said hydrate-forming components, then contacting the residual gas with water and carbon tetrachloride under temperature and pressure conditions causing formation of a mixed hydrate of the hydrocarbon components and carbon tetrachloride, said mixed hydrate having substantially lower vapor pressure than the hydrate of said hydrocarbon components alone and at corresponding temperature, separating said inert constituent from the mixed hydrate, heating and dissociating the hydrates produced by said partial hydration of said components, heating and dissociating the mixed hydrate, and separating carbon tetrachloride from the vapors resulting from dissociation of the mixed hydrate.

ARTHUR J. L. HUTCHINSON.